United States Patent [19]

Hufschmid

[11] Patent Number: 4,634,406
[45] Date of Patent: Jan. 6, 1987

[54] MULTIPLE SPEED TRANSMISSION FOR BICYCLES

[76] Inventor: Eric B. Hufschmid, 1268 Camino Rio Verde, Santa Barbara, Calif. 93111

[21] Appl. No.: 763,280

[22] Filed: Aug. 7, 1985

[51] Int. Cl.[4] .............................................. F16H 9/02
[52] U.S. Cl. ...................................................... 474/49
[58] Field of Search ................................... 474/49-57

[56] References Cited

U.S. PATENT DOCUMENTS

| | | | |
|---|---|---|---|
| 1,424,327 | 8/1922 | Trout | 474/49 |
| 3,798,989 | 3/1974 | Hunt | 474/49 |
| 3,861,227 | 1/1975 | Hunt | 474/47 |
| 4,030,373 | 6/1977 | Leonard | 474/53 |
| 4,529,394 | 7/1985 | Miro | 474/49 |

Primary Examiner—James A. Leppink
Assistant Examiner—Frank H. McKenzie, Jr.

[57] ABSTRACT

This invention is a variable speed transmission member for bicycles for engagement with a positive drive belt. It includes a variable radius sprocket and a means to control its effective radius. The variable radius sprocket is a rotatable disc with a plurality of radial slots therein. A slidable sprocket segment is mounted in each slot. Each segment has a spring biased retaining means to lock it at a particular radial location. The means to control the effective radius of the segments comprises a plurality of pivotal prongs positioned so that they can be pivoted, under manual control, into the path of the segments to push the segments to a different radial location.

5 Claims, 9 Drawing Figures

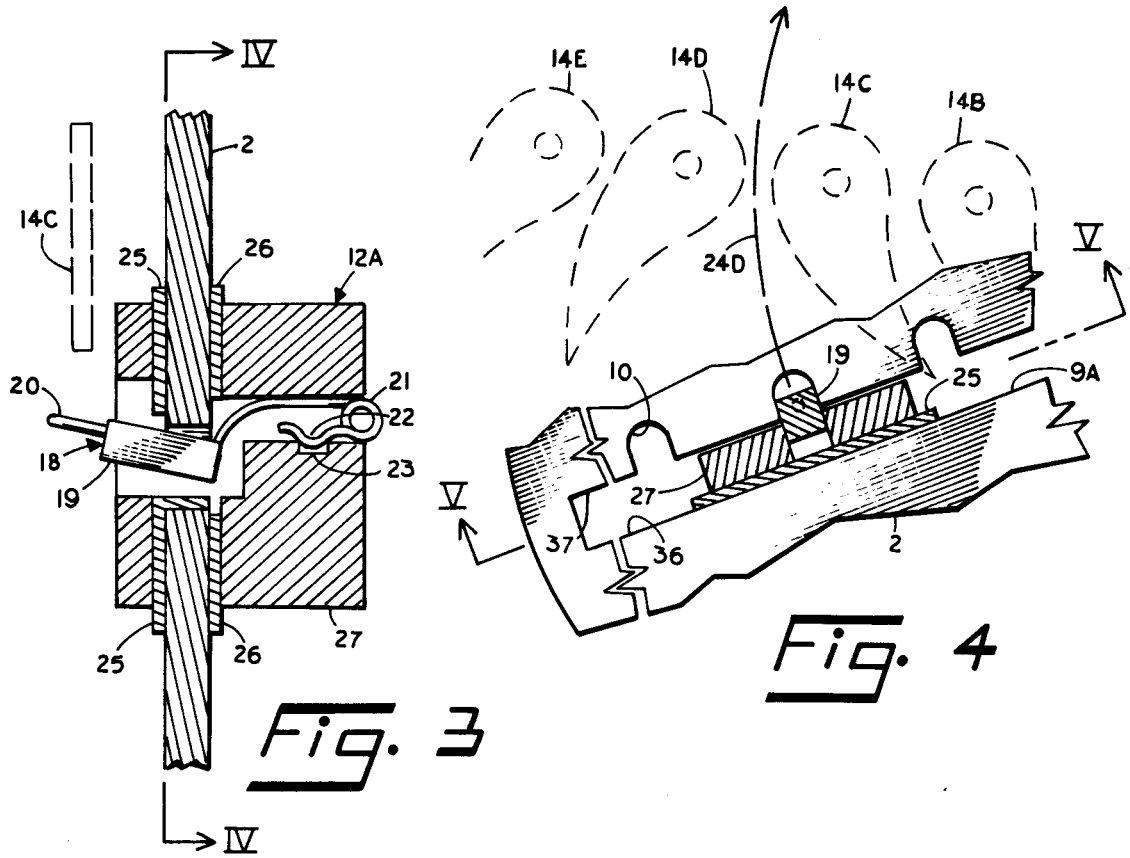
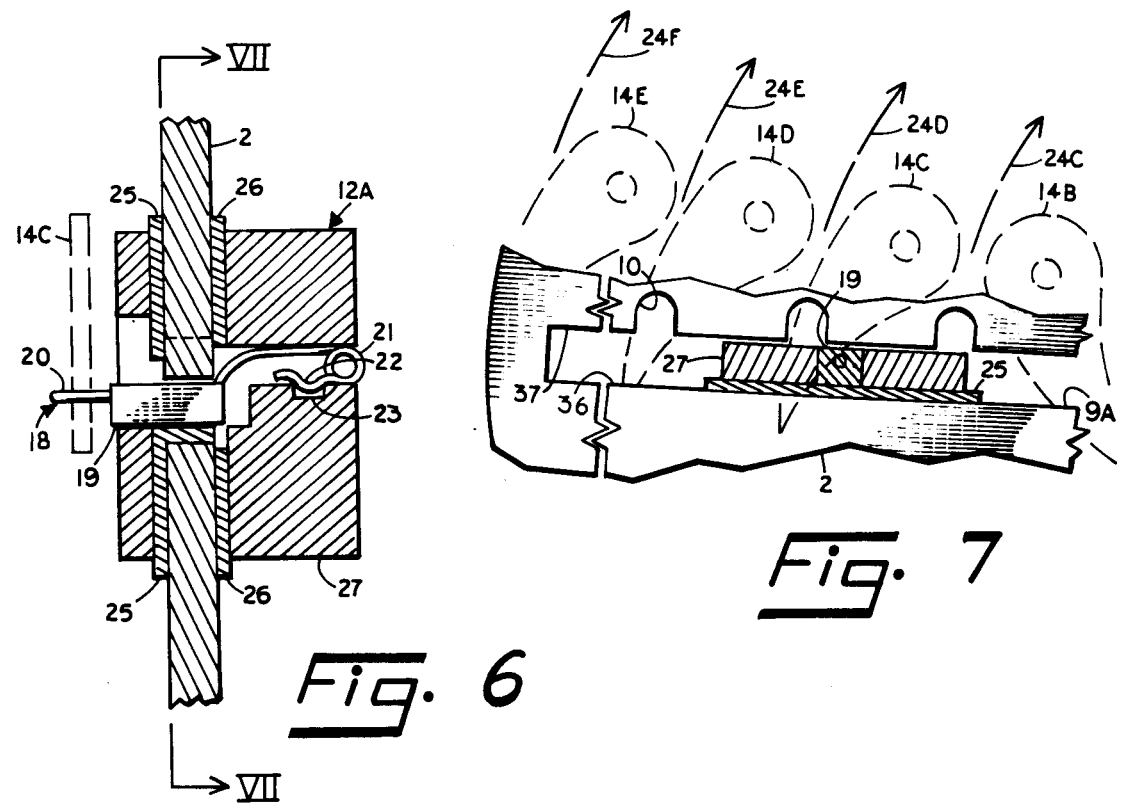

MULTIPLE SPEED TRANSMISSION FOR BICYCLES

BACKGROUND OF THE INVENTION

Dozens of variable radius transmissions have been invented for bicycles, none of which has experienced commercial success. The reason so many people invent variable radius transmissions is because they are more convenient to use than the derailleur drives which currently dominate the bicycle market. Specifically, variable radius transmissions can change speeds under power, and they do so very smoothly, whereas the rider of a derailleur drive must ease up on the pedals while shifting, and even then the shifting operation is not always smooth. Also, the gear ratios provided by variable radius transmissions cascade evenly from the highest to lowest speed, whereas the gear ratios of the typical 10-speed derailleur drive jump about erratically. For example, on the typical 10-speed bicycle, sixth speed has a gear ratio between that of second and third.

Unfortunately, all variable radius transmissions invented to date suffer from disadvantages that outweigh their advantages. Specifically, they are too heavy, too bulky, too difficult to perform maintenance on, too expensive, and/or too fragile. The 10-speed derailleur drive is not very convenient to operate, but it is inexpensive and can handle dirt, mud, water, and neglect better than every other alternative transmission ever invented.

In order for a variable radius transmission to appeal to consumers it must contain few and inexpensive parts, it must be easy to maintain, and it must be rugged enough to survive road dirt, rain, and neglect. However, the typical design for variable radius transmissions does not seem capable of meeting these requirements. This design, of which there are dozens of variations, includes a disc with a plurality of radial slots. A slidable drive segment is mounted in each slot. The segments are coupled together in some manner and can be slided radially in and out in unison. Unfortunately, this type of variable radius transmission is always more complex than a derailleur drive, which in turn makes it more expensive and more difficult to maintain. It also has a shorter life because its components are subjected to high stress and friction; the reason being that the segments are forced to slide while engaged to the chain and, therefore, under heavy load. Furthermore, this type of variable radius transmission requires liquid lubricants to permit the segments to slide, but liquid lubricants attract dust and grit, which abrade the components. The dirt could also build up to the point at which it clogs the mechanism and renders it useless.

In an attempt to rectify those problems, three variable radius transmissions were patented in the 1970's in which the drive segments are independent instead of coupled together. These inventions described in U.S. Pat. Nos. 3,798,989, 3,861,227, and 4,030,373. The segments in these inventions slide only when disengaged from the drive belt; therefore, they do not experience as much stress and abrasion when they slide. Each drive segment in these inventions contains a spring biased retaining means to lock it at a particular position. The effective radius of these inventions is controlled by a gate which is moveable radially. The drive segments must pass through this gate, and when the gate is moved to a different radial position the segments collide with it and are pushed to a different position.

Unfortunately, the first mentioned of the inventions suffers from the inability to provide more than three speeds. Also, its effective shape varies from a small circle to a large oval, instead of from a small circle to increasingly larger circles.

The second of the previously mentioned inventions actually made it to the point of test marketing, but it was soon abandoned because of its short lifetime and noisey operation.

The last mentioned invention has not been put out on the market, and if it was, consumers would certainly dislike its complexity. Furthermore, its use of V-belts, a friction plate, screws, and tiny universal joints make the invention very susceptible to mud, dirt, rain, and fog. Indeed, it is considered very poor engineering practice to use friction drives in slow speed, high torque applications because they tend to slip. Also, the drive segments in this invention are held at specific radial locations by gripping tiny serations in their tracks, but if the segments require liquid lubricants then the serations will quickly clog with dirt. Because this invention is so easily harmed by dirt and moisture, the patent calls for a protective cover to completely enclose the entire drive train, thereby shielding it from the outside world. Unfortunately, protective covers have been available for bicycle gearing systems for decades as a method to protect the chain from dirt and water, but most consumers refuse to use them because of their inconvenience. Therefore, in order for a bicycle gearing system to appeal to consumers it must be rugged enough to operate exposed to airborne dirt and moisture, and ideally it would also be unaffected by the mud that is kicked up by the tires. Consumers have so far been willing to buy only a partial cover, so that is all a bicycle gearing system should require.

It is an object of my invention to provide a variable radius gearing system with all the characteristic advantages of such transmissions, as previously mentioned, but one which contains few and inexpensive parts, is easy to maintain, and is so rugged it is unaffected by airborne dirt and water.

SUMMARY OF THE INVENTION

This invention is a multiple speed transmission member for a bicycle. It includes a variable radius sprocket and a speed control means to control the effective radius of the sprocket.

The variable radius sprocket is the type in which a plurality of drive segments are independent of one another and change position one at a time after they disengage the chain. It comprises a rotatablé disc with a plurality of radial slots therein. A plurality of notches are cut into one side of each of the slots. A slidable sprocket segment is mounted in each slot. Each sprocket segment includes a spring biased retaining means which normally engages a notch for the purpose of locking the segment at a particular radial location. By pushing the retaining means out of the notch, the segment is free to slide and can be pushed to a different notch, thereby altering the effective radius of the mechanism.

The speed control means controls the effective radius of the sprocket. It includes a plurality of prongs attached to a supporting means. The prongs are pivotal, under manual control. The supporting means is positioned alongside the variable radius sprocket in such a way that there is always one prong that can be pivoted into the path of the segments. When a prong is pivoted into the path of a segment, the spring biased retaining means inside the segment collides with the prong, is knocked out of the notch it is engaged to, and the segment is pushed to an adjacent notch, thereby altering the effective radius of the mechanism.

It is an object of this invention to be rugged enough to operate without a protective envelope; therefore, it has been specifically designed for engagement with chains, or any other positive drive belt. Also, in order to prevent dirt from building up and clogging the mechanism, all components are designed to operate without liquid lubricants. Lubrication is avoided by designing the invention to use as many plastic parts as possible, and by using replaceable nylon liners to separate the metal components.

These and other objects and features will become more apparent from the following description.

BRIEF DESCRIPTION OF THE DRAWINGS

FIG. 3 is a cross sectional view of a sprocket segment while it is locked at a notch taken as shown by line 3—3 of FIG. 2.

FIG. 4 is a cross section of the segment of FIG. 3 taken on line 4—4 of FIG. 3

FIG. 6 is a cross section of the segment as it is sliding to a different radial location.

FIG. 7 is a cross section of the segment taken along line 7—7 in FIG. 6.

DETAILED DESCRIPTION OF THE INVENTION

Figure 1:
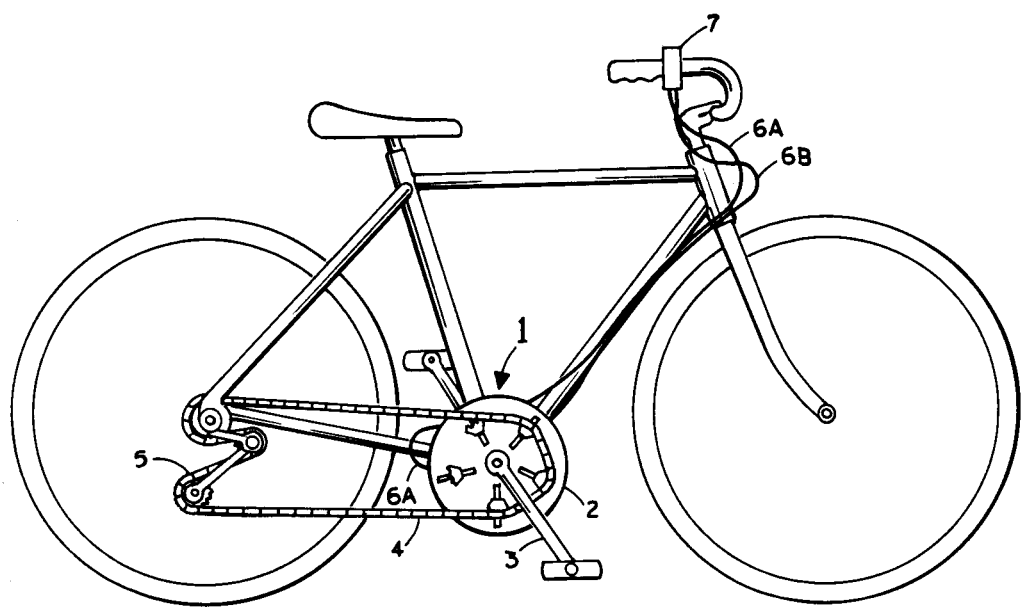
FIG. 1 shows a bicycle fitted with the invention.

Referring to FIG. 1, the multiple speed transmission member 1 includes a rotatable disc 2 attached to the crank 3 of a bicycle. The speed control means is not visible because it would be behind the disc in this perspective. A conventional chain 4, a conventional sprocket (not visible) on the rear wheel, and a chain tensioner 5 complete the drive train.

Two control cables housed in sheaths 6a and 6b run from the speed control means to a control ring 7 on the handlebars. By turning the ring the rider can control the effective radius of the multiple speed mechanism 1.

Figure 2:
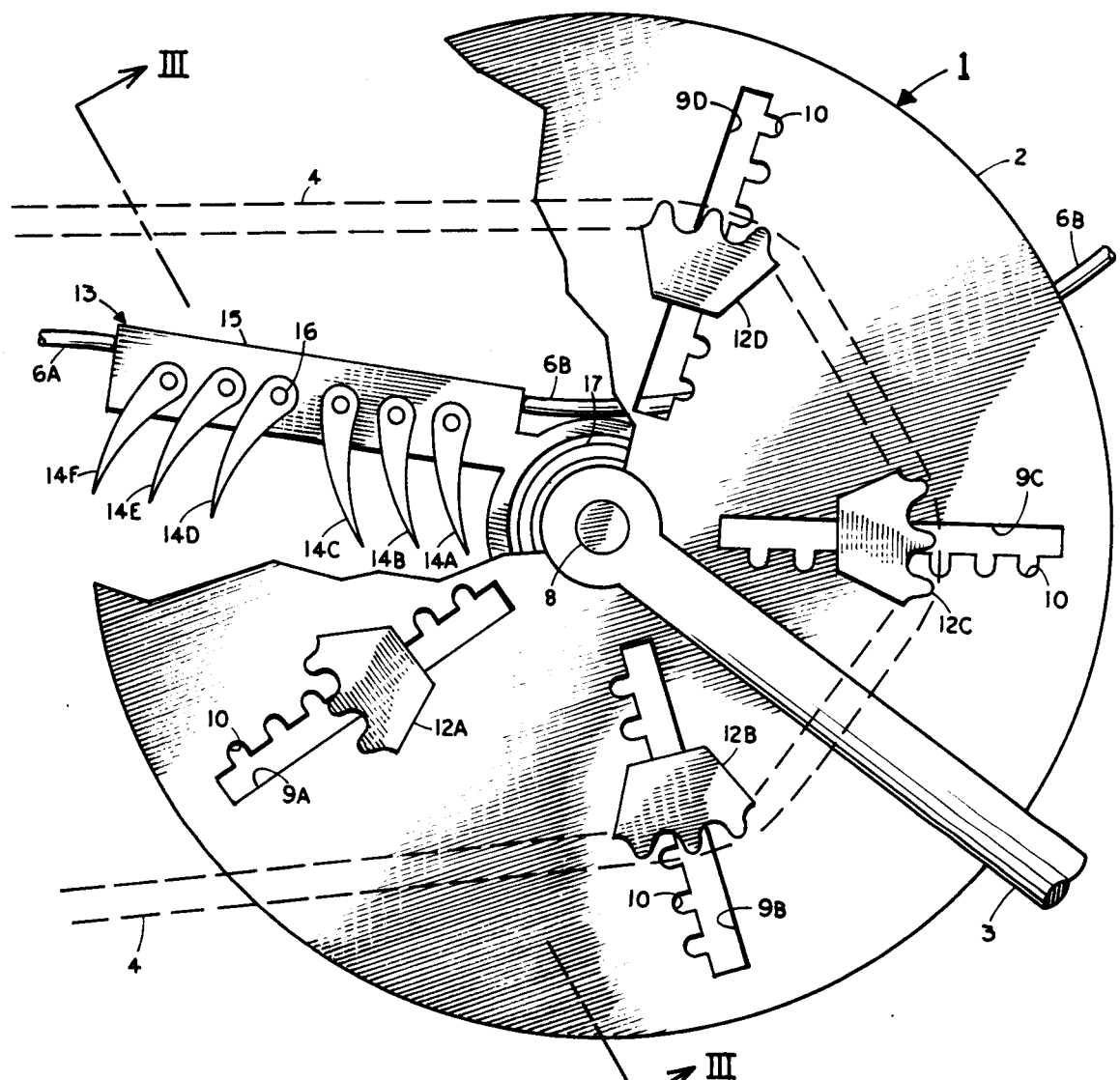
FIG. 2 is a cutaway view of the invention showing both the variable radius sprocket and the speed control means.

Referring to FIG. 2, the multiple speed mechanism 1 includes a disc 2 mounted to the crank 3, which would rotate clockwise in the drawing around a crankshaft 8. The disc has a plurality of radial slots, designated 9a-9d. (The fifth slot has been cut out.) A plurality of notches 10, corresponding to the number of effective radii of the mechanism, are cut into one side of each slot. The figure is of a seven speed device so seven notches are cut in each slot. (Not all seven are visible.) A sprocket segment, designated 12a-12d, is mounted in each slot. The segments engage the chain 4.

The speed control means 13 includes a plurality of plastic prongs, 14a-14f. These prongs are attached to a supporting means 15 by a rivet or other connecting means 16, upon which they can pivot. The supporting means 15 is attached to the bicycle frame. In the preferred embodiment the supporting means is attached to the housing 17 of the crankshaft 8. By attaching it to the crankshaft housing, as opposed to attaching it to one of the bicycle frame tubes, proper alignment of the speed control means can be had at no additional trouble because the crankshaft is the reference point for aligning the components of this invention. Two cables housed in sheaths 6a and 6b enter opposite ends of the supporting means 15 and continue up to the control ring on the handlebars.

FIGS. 3-7 illustrate the structure and operation of the sprocket segments. The prongs 14 have also been shown in outline to clarify their position and function.

In FIGS. 3 and 4 the segment 12a of FIG. 2 is shown locked in a notch 10. The segment includes a main body 27 and a spring biased retaining means 18. The retaining means is a wire or strip of spring material attached to a block of nylon 19. The block 19 engages the notch 10 to prevent the segment from moving. One end of the retaining means, which shall be referred to as the head 20, protrudes from one side of the segment, while the coiled end 21 protrudes from the other side.

Since it is an object of this invention to be inexpensive to maintain, the retaining means is designed to be inexpensive and to sacrifice itself to protect the other, more expensive components. For example, in the preferred embodiment, the block 19 is made of plastic so that when dirt gets into the transmission it becomes embedded in the plastic rather than abrade the slots 9. Also, the head 20 of the retaining means is more fragile than the other components so that it will bend or break under abnormal stress to protect the other components.

Since another object of this invention is to be easy to maintain, the retaining means 18 is designed so that when it is worn or damaged it can be replaced without special tools or disassembly of any components. Specifically, the retaining means is designed so that is can be removed simply by poking the coil 21 with any small object, such as a nail or another retaining means. The retaining means will then pop out. A new retaining means is inserted into the segment by hand simply by pushing it in, coiled end first. The retaining means is held in its proper position inside the segment by giving the segment and retaining means complementary shapes which interlock. In the preferred embodiment, as shown in FIGS. 3 and 6, a semicircular crimp 22 in the retaining means interlocks with a groove 23 in the segment.

The radial location of the prongs can be understood with the aid of FIG. 4. As the disc 2 rotates, the head 20 of the retaining means 18 will travel in a circular path, as shown by dashed line 24d. The head 20 will pass between prongs 14c and 14d without contacting either one. As the segment is moved from one notch to another, the head 20 will trace out a plurality of concentric circles of different diameter, shown in FIG. 7 as dashed lines 24c-24f. The prongs are positioned so that there is one prong between every two adjacent circular paths. For instance, in FIG. 7 prong 14c is between circular paths 24c and 24d. This arrangement results in there being one fewer prong than there are radial positions for the segments.

The radial location of the notches 10 is simply the particular locations which will allow the sprocket segments to mesh with the chain.

As shown in FIG. 4, the surface of slot 9a consists of one smooth side 36 and one side 37 with notches. The smooth side is the one which experiences the highest contact pressures with the segments, and it is the one on which the segments slide. It is designed smooth to prevent dirt buildup and to permit nylon liners to slide easily on it. Two replaceable nylon liners 25 and 26 are used to separate the segments from the slots to avoid bare metal on bare metal, thereby avoiding the need for liquid lubricants, which in turn prevents dirt buildup. Liner 25 is flat with a flap in its center to cover the smooth side 36 of the slot. Liner 26 is flat. Although it is not mandatory, one of the liners could have a flap to cover the notched side 37 of the slot.

Figure 5:
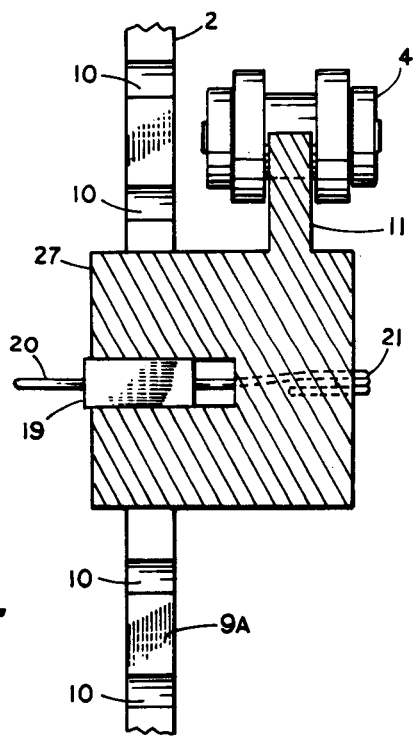
FIG. 5 is a cross sectional view of the segment taken on line 5—5 of FIG. 4.

FIG. 5 shows a different view of the segment. The chain 4 engages toothed member 11 which is attached to the segment body 27.

In FIGS. 6 and 7 the segment 12a is shown unlocked from the notch and sliding to an adjacent notch. The prong 14c has been pivoted, which has caused its pointed end to cross path 24d. In this position the prong lies in the path of the head 20 of the retaining means 18. As the head 20 tries to follow path 24d, it collides with prong 14c. In so doing, the nylon block 19 is knocked out of the notch, freeing the segment. Further rotation of the disc 2 causes the head 20 to slide along prong 14c, and in so doing the segment will be pushed to an adjacent notch. The head 20 will then follow path 24c until prongs 14c or 14b are pivoted into path 24c. Within one revolution of the disc 2, all the segments will have been pushed to the new radial position. This results in reducing the effective radius of the invention.

Figure 8:
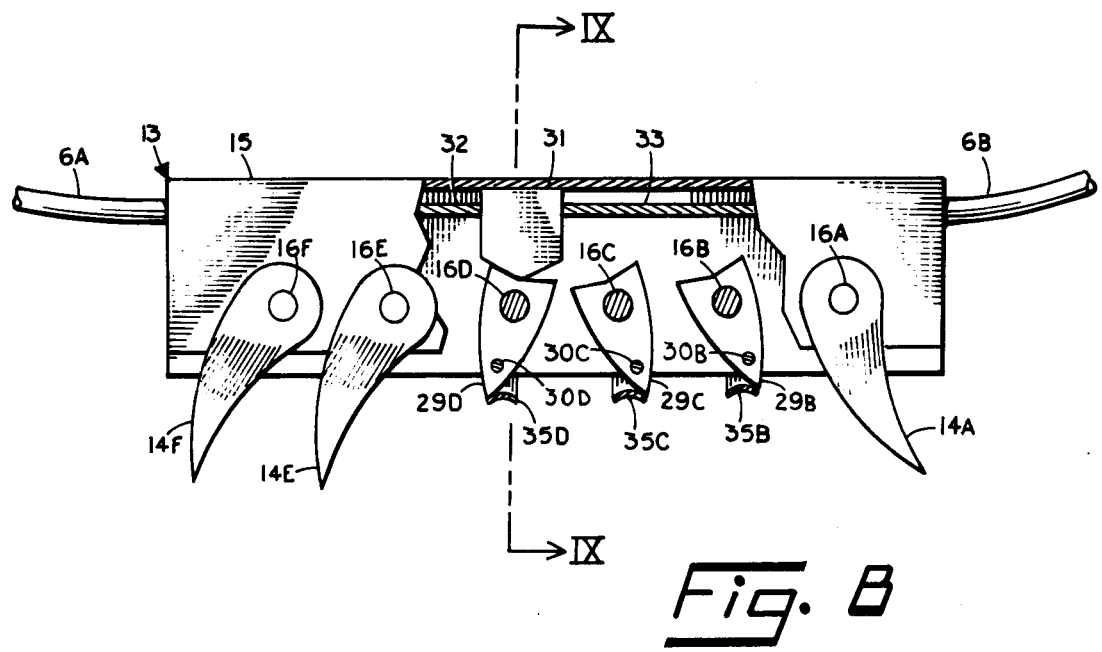
FIG. 8 is a cutaway view of the speed control means.
Figure 9:
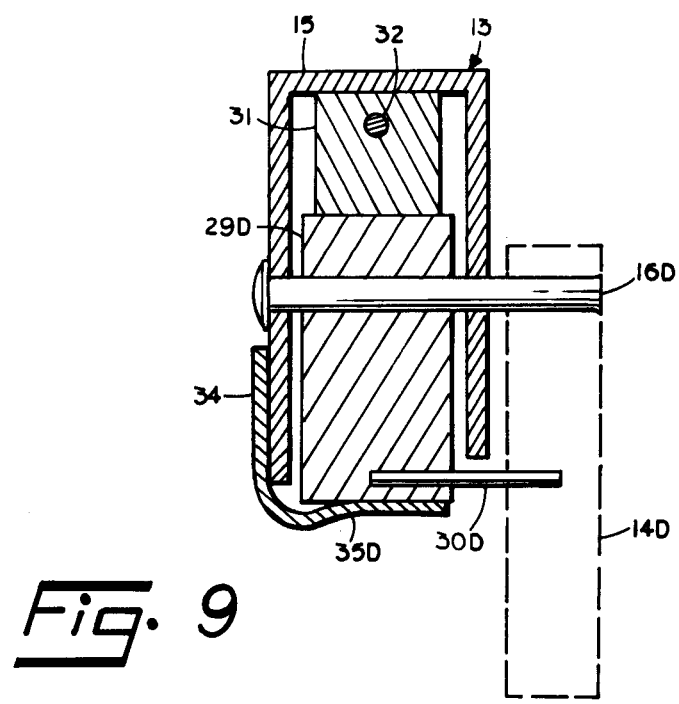
FIG. 9 is a cross section of the speed control means taken on line 9—9 of FIG. 8.

FIGS. 8 and 9 show how the speed control means 13 operates. The prongs 14 are mounted on a supporting means 15 by a rivet or other connecting means 16 upon which they can pivot. Inside the supporting means are rockers 29 which are attached to the rivets 16. The rockers and prongs are connected together in a manner that causes them to pivot together as if they were one unit. For example, they could grip a fluted rivet so as to prevent slipage; however, as shown in the FIGURE, in the preferred embodiment they are connected together with a pin, 30d–30b.

Also inside the supporting means 15 is a plastic wedge 31. The wedge attaches to the ends of the cables 32 and 33. These cables run up to the control ring 7 of the handlebars (as shown in FIG. 1). When the rider turns the control ring, the cables 32 and 33 are pulled one direction or the other, which in turn pulls the wedge 31 back and forth through the supporting means 15. As the wedge slides through the supporting means it knocks over the rockers 29, which causes the prongs to pivot, which in turn changes the effective radius of the invention. Pulling the wedge to the right in the FIGURE will reduce the effective radius, while pulling it to the left will increase it.

Rather than memorize which direction to turn the control ring to increase or decrease the effective radius of the invention, the control ring could have numbers on it corresponding to the speeds of the transmission. For example, a seven speed transmission would have the numbers 1 through 7 printed on the ring.

The bicycle rider would change speeds by turning the control ring 7 (FIG. 1) to the speed he desires. For example, if he was in fourth speed, as shown in FIG. 2, and if he wanted to drop to first speed, he would merely turn the control ring to indicate first speed. That action would pull cable 33 to the right (in FIG. 8), which in turn would pull the wedge 31 to the right, which in turn would cause prongs 14c, 14b, and 14a to pivot. Prong 14c would then begin to push the segments to their third speed position. Within one revolution of the pedals all the segments would be in third speed position, at which time prong 14b would begin to knock the segments to second speed. Within one more revolution of the pedals all the segments would be at their second speed position, at which time prong 14a would begin to push them to first speed. The bicycle rider would feel a smooth drop from fourth speed to third, to second, and finally to first.

The pin 30 is used to control the arc through which the prongs pivot. The pin restricts movement by hitting the supporting means 15 after travelling through a predetermined arc.

Each rocker 29 is firmly held in one of its two pivotal positions by a spring. In the preferred embodiment a single flat spring 34 has a separate leg 35 for each rocker to put constant pressure against each rocker to prevent accidental movement. The spring 34 is attached to the supporting means 15.

While a specific embodiment of my invention has been described herein, it should be apparent that various superficial changes can be made to this invention without departing from the intent or operation of the invention. For example, by providing the disc 2 with six or eight slots instead of five, only two of the segments need teeth; the others can be "idler" segments upon which the chain rides but does not engage. The idlers would allow more effective radii to be obtained from the same size disc 2. Also, the transmission will feel smoother when pedalling because the effective sprocket created by the larger number of segments will be more nearly circular. However, such a design is more complex and expensive. Another specific variation is to replace cable 32 by a spring or a spring powered recoiling means which puts constant tension on cable 33. In such a design, only cable 33 would run up to the control ring on the handlebar. Such a design would have a different appearance, and it would feel different to operate, and some consumers may prefer it.

I claim:

1. A variable speed transmission member for a bicycle comprising:
   a. a variable radius sprocket, said sprocket having a plurality of moveable sprocket segments adapted for engagement with a positive drive belt, each of said segments being mounted in a different radial slot of a rotatable disc and held at one of a plurality of predetermined radial positions by a spring biased retaining means therein; and
   b. a speed control means, said control means having a plurality of prongs mounted on a supporting means so as to be pivotal under manual control, said supporting means being positioned so that said prongs can be pivoted into the path of said retaining means to push said segments to a different radial position.

2. The structure as defined in claim 1 wherein said spring biased retaining means and said sprocket segments have complementary shapes which allow said retaining means to interlock with said segments so as to allow removal and insertion of said retaining means without special tools or disassembly of any components.

3. The structure as defined in claim 1 wherein a plurality of notches corresponding to the number of effective radii of said variable radius sprocket are cut into one side of each of said slots.

4. The structure as defined in claim 3 wherein said spring biased retaining means engages said notches as a way to lock said segments at particular radial locations.

5. A variable speed transmission member for a bicycle comprising:
   a. a variable radius sprocket, said sprocket having a plurality of moveable segments, at least two of said segments being adapted for engagement with a positive drive belt, each of said segments being mounted in a different radial slot of a rotatable disc and held at one of a plurality of predetermined radial positions by a spring biased retaining means therein; and
   b. a speed control means, said control means having a plurality of prongs mounted on a supporting means so as to be pivotal under manual control, said supporting means being positioned so that one of said prongs can always be pivoted into the path of said retaining means to push said segments to a different radial position.

* * * * *